United States Patent
Cadens Ballarin (10) Patent No.: US 9,833,933 B2
(45) Date of Patent: Dec. 5, 2017

(54) METHOD AND APPARATUS FOR MANUFACTURING A BODY MADE OF COMPOSITE MATERIAL PROVIDED WITH AN INNER CAVITY WITH AN OUTWARD OPENING

(71) Applicant: MAT GLOBAL SOLUTIONS, S.L., Terrassa (Barcelona) (ES)

(72) Inventor: Javier Cadens Ballarin, Terrassa (ES)

(73) Assignee: MAT GLOBAL SOLUTIONS, S.L., Terrassa (ES)

( * ) Notice: Subject to any disclaimer, the term of this patent is extended or adjusted under 35 U.S.C. 154(b) by 602 days.

(21) Appl. No.: 14/373,767

(22) PCT Filed: Jan. 22, 2013

(86) PCT No.: PCT/ES2013/070023
§ 371 (c)(1),
(2) Date: Jul. 22, 2014

(87) PCT Pub. No.: WO2013/110839
PCT Pub. Date: Aug. 1, 2013

(65) Prior Publication Data
US 2014/0352036 A1 Dec. 4, 2014

(30) Foreign Application Priority Data

Jan. 24, 2012 (ES) .................................. 201230091

(51) Int. Cl.
*A42B 3/04* (2006.01)
*A42C 2/00* (2006.01)
(Continued)

(52) U.S. Cl.
CPC ............. *B29C 43/203* (2013.01); *A42B 3/04* (2013.01); *A42C 2/002* (2013.01); *B29C 43/10* (2013.01);
(Continued)

(58) Field of Classification Search
CPC ... B29C 70/081; B29C 70/44; B29C 43/3642; B29C 2043/3649; B29L 2031/4821; B29D 99/064; A42B 3/04; A42C 2/002
See application file for complete search history.

(56) References Cited

U.S. PATENT DOCUMENTS

| 4,338,070 A | 7/1982 | Nava |
| 4,820,568 A * | 4/1989 | Harpell .................. B29C 70/12 |
| | | 428/113 |

(Continued)

FOREIGN PATENT DOCUMENTS

| JP | 59198119 A * | 11/1984 | ............. A42B 3/063 |
| JP | 08-269809 A | 10/1996 | |

(Continued)

OTHER PUBLICATIONS

Partial machine translation of JP 59-198199 A dated Nov. 1984 obtained from the espace website.*

(Continued)

*Primary Examiner* — Robert B Davis
(74) *Attorney, Agent, or Firm* — Sughrue Mion, PLLC (57) ABSTRACT

The present invention relates to a method of manufacturing a body made of composite material such as a shell of a helmet. Said body constitutes a multilayer structure where each layer is formed by superposed strata comprising portions of fabrics preimpregnated with thermoplastic resin in which at least some of said layers are formed by woven or non-woven LFRTP-type preimpregnated fabrics. The outer layer is formed by strata of portions of "veil" type or "felt" type fabrics, with non-woven and non-oriented fibers of lengths comprised between 5 and 20 mm. In the method, the multilayer structure arranged in a mold is subjected to the action exerted by a bag that is inflated due to pressure occupying the cavity of the mold.

43 Claims, 4 Drawing Sheets (51) Int. Cl.
*B29C 43/36* (2006.01)
*B29C 70/44* (2006.01)
*B29C 43/20* (2006.01)
*B29C 70/08* (2006.01)
*B29C 43/10* (2006.01)
*B29C 43/52* (2006.01)
*B29L 31/48* (2006.01)
*B29L 31/00* (2006.01)

(52) U.S. Cl.
CPC .......... *B29C 43/3642* (2013.01); *B29C 43/52* (2013.01); *B29C 70/081* (2013.01); *B29C 70/44* (2013.01); *B29C 2043/3649* (2013.01); *B29L 2031/4821* (2013.01); *B29L 2031/768* (2013.01)

(56) References Cited

U.S. PATENT DOCUMENTS

| | | | | |
|---|---|---|---|---|
| 4,953,234 | A * | 9/1990 | Li | A42B 3/06 2/2.5 |
| 5,110,681 | A * | 5/1992 | Satake | B29B 15/105 428/419 |
| 5,616,650 | A * | 4/1997 | Becker | C08G 18/10 525/102 |
| 5,851,932 | A * | 12/1998 | Dickson | B32B 5/26 428/213 |
| 6,468,644 | B1 * | 10/2002 | Hong | A42B 3/061 2/10 |
| 6,599,444 | B2 * | 7/2003 | Burnell-Jones | C09K 11/02 252/301.36 |
| 8,117,679 | B2 * | 2/2012 | Pierce | A42B 3/125 2/410 |
| 2007/0220662 | A1 * | 9/2007 | Pierce | A42B 3/125 2/410 |
| 2008/0014453 | A1 * | 1/2008 | Levesque | B29C 51/085 428/475.5 |
| 2009/0017322 | A1 * | 1/2009 | Hayes | B29C 51/145 428/515 |
| 2009/0309260 | A1 * | 12/2009 | Keuchel | B29C 70/50 264/258 |
| 2010/0209683 | A1 | 8/2010 | Scheubel et al. | |
| 2010/0275337 | A1 * | 11/2010 | Bhatnagar | F41H 1/08 2/2.5 |
| 2011/0159233 | A1 * | 6/2011 | Marissen | B29C 47/0014 428/98 |
| 2012/0175046 | A1 * | 7/2012 | Jones | B29C 43/3642 156/189 |
| 2013/0095716 | A1 * | 4/2013 | Hanks | B29C 70/56 442/60 |

FOREIGN PATENT DOCUMENTS

WO 2007/045466 A1 4/2007
WO 2010/019697 A1 2/2010

OTHER PUBLICATIONS

International Search Report for PCT/ES2013/070023, dated Jun. 3, 2013.
Spanish Search Report for ES 201230091, dated Jan. 24, 2014.

* cited by examiner

METHOD AND APPARATUS FOR MANUFACTURING A BODY MADE OF COMPOSITE MATERIAL PROVIDED WITH AN INNER CAVITY WITH AN OUTWARD OPENING

CROSS REFERENCE TO RELATED APPLICATIONS

This application is a National Stage of International Application No. PCT/ES2013/070023, filed Jan. 22, 2013, claiming priority from Spanish Patent Application No. P 201230091, filed Jan. 24, 2012, the contents of all of which are incorporated herein by reference in their entirety.

TECHNICAL FIELD OF THE INVENTION

The present invention relates to a method of manufacture particularly aimed at manufacturing a body made of thermoplastic matrix composite material provided with an inner cavity with an outward opening, said cavity comprising at least one concave curved wall and the outward opening having a smaller dimension or width than the maximum dimension of the inner cavity between two opposite walls. Particularly, said hollow body can be the shell of a protective helmet, such as for example a motorcycle helmet, or the structural component of sports footwear for practicing sports that require very rigid footwear, for example a ski boot. Therefore, the body object of manufacture according to the method is a body which, without being completely closed and hollow, such as a tank for example, has a sufficiently closed hollow cavity the geometry of which hinders demolding the body using direct methods (injection, thermoforming, etc.). The method of manufacture developed also allows making parts that have a non-homogenous thickness and composition throughout the entire part, and therefore different according to the area. This enables being adapted to parts in which mechanical stresses or conditions to be met are various or non-homogenous throughout the entire part.

The invention also relates to an apparatus for carrying out the method. Finally, it is also disclosed a shell of a helmet with a material typology in accordance with the material used in the steps of the method making it particularly suitable for being used in consumer goods in which the improvement in the relation of mechanical properties, such as impact behavior or flexural rigidity, with respect to the weight can be exploited.

BACKGROUND OF THE INVENTION

Many helmet typologies, for example motorcycle helmets, ski helmets, climbing helmets, horse riding helmets, aviation and nautical sports helmets, some types of cycling and also work hard hats or bulletproof helmets incorporate an element or part commonly known as shell (known as "shell" in English), this being the outer casing of the helmet. Said shell element has various main functions, one of them being that of distributing the forces applied at some points on the surface of said shell as a consequence of a hypothetical impact in a large enough area of the user's skull, such that the levels of generated mechanical stress are lower and thus prevent or minimize biomedical damage or injuries.

In conjunction with the impact absorbing element inside the shell, commonly manufactured in expanded polystyrene (EPS) foam, the shell is responsible for managing the deceleration process of the impact, which allows lengthening the deceleration stroke by means of the thickness of the helmet, such that the deceleration pulse experienced by the encephalic mass of the user is sufficiently less than that which it would experience without said helmet, below specific maximum acceleration and pulse amplitude parameters, thus reducing the consequent inertial forces and preventing or minimizing biomedical damage or injury.

Again, in conjunction with the impact absorbing element, another function of the shell is to absorb a large part of the initial kinetic energy of the impact by means of helmet deformation or destruction work, such that the final kinetic energy is reduced, thus minimizing the rebound velocity and the need of managing a higher deceleration, reducing the elastic component of the impact.

The shell is also the component of the helmet responsible for withstanding possible stress abrasion due to the helmet surface sliding on or against the impact surface, thus reducing the transmission of these stresses to the user, reducing or minimizing biomedical damage or injuries, as well as the component acting as functional and structural support of all the parts of the helmet during regular use.

It is worth mentioning that the shells described above should not be mistaken with the shells of other helmet typologies, such as most bicycle helmets used today and certified according to EN 1078, for example, the function of which is merely as a finish, given that the functions described above are satisfied to the extent required for said application and regulation by the inner impact absorption element. Said shells, manufactured from thermoplastic sheets or films having a very small thickness, less than 0.5 mm, by means of thermoforming processes or the like, are not within the scope of application of the invention.

The functions described above for the shell involve the need for said shell to provide a series of generic mechanical properties by means of its geometric structure and constituent materials, such as:

rigidity or ability to withstand the application of impact forces maintaining a sufficiently contained deformation level according to the application and regulation to be complied with, regardless of testing conditions such as temperature or type of impact anvil applied;

plasticity or ability to be permanently deformed to a point of no return when stresses above the elastic range thereof are applied to it;

toughness or ability to absorb energy before breaking; and abrasion resistance.

For these requirements, an ideal material for the shell would have a very vertical stress-deformation diagram and a very large and planar plastic area before breaking.

The quantification of said generic mechanical properties will depend on the product typology and on the testing specifications of the regulation to be applied and must, therefore, be modulated accordingly.

In contrast to the mechanical requirements imposed for the product, it is necessary and appropriate to limit the total weight of the shell element for the sake of ergonomics and comfort (also for promoting helmet use). The concept of using a composite material, particularly a fiber reinforced thermoplastic matrix material grows out of the dispute between the need for mechanical performance and weight.

Document WO2007045466-A1 describes using a composite material in the intermediate section of the hollow body basically constituting a fuel tank for vehicles with an internal combustion engine. Said section is formed by the superposition of multiple layers formed by portions of sheets or fabrics preimpregnated with polymeric resin of which the last layer, the outermost, is formed by at least one band of portions of sheets or portions of weave fabric, twill or plain type, in carbon fiber. Although the body constituting the tank is a body provided with a hollow and an opening, as occurs with a shell, the opening of the tank is considerably smaller than the maximum diameter of the cavity of the tank and when added to the resistance-related requirements of respective regulations, manufacturing a shell by the standard methods used for fuel tanks becomes unviable.

A particular type of materials that seems to satisfy the needs to be complied with by the shell are those known with the acronym LFRTP, i.e., Long Fiber Reinforced Thermoplastic, or CFRTP, i.e., Continuous Fiber Reinforced Thermoplastic.

One of the basic components of an LFRTP-type material is the reinforcement fabric, the material used usually being made of glass fiber, and/or aramid fiber and/or carbon fiber. With respect to the structure of the fabric, it can be a felt-type fabric, with fibers without a specific orientation joined together by means of a binder; a woven fabric, in which, depending on the arrangement of the weft and warp yarns, can be distinguished between a plain fabric, a twill fabric, a satin fabric, a unidirectional fabric (with most of the yarns aligned in one direction) and a multiaxial fabric. In addition to the structure of the fabric, the fabrics can be superposed in various manners, for example each layer following a different direction or combining certain types of fabrics with others, depending on the application.

The other basic component of any polymeric composite material is the matrix, the most usual matrix being thermosetting, those having an epoxy base, a polyester base, a vinylester base, an acrylic base, a phenolic base and a polyurethane base being distinguished, among others. In contrast to thermosetting matrices, there are also thermoplastic matrices from the group formed by polypropylenes, polyamides, polyethylene-terephthalates, polybutylene-terephthalates, polycarbonates, polyphenylene oxides, polyoxymethylenes, polyurethanes, etc., which are those classified under the name "LFRTP composite".

The production and automation in manufacturing continuous fiber reinforced products using thermosetting resins as a matrix is relatively simple due to the low viscosity they have prior to curing because this allows for an easy impregnation of the fiber using low pressures, below 10 bars, which allows using relatively unsophisticated, lower cost processes of manufacture.

However, in comparison with thermoplastic resins, thermosetting matrices have serious limitations, such as low productivity because they require a long time for complete curing, involve processes entailing certain fouling because the resin adheres throughout all the equipment and installations, and particularly during processing, very large amounts of volatile organic compound emissions which are very hazardous to the health of operators are produced which entail increasing process difficulties for the prevention thereof as occupational safety regulations establish more restrictive limits. Additionally, there is a limited number of resins having a very limited toughness and which furthermore are not recyclable. On the other hand, the impregnation of continuous fibers using thermoplastic materials is very complicated due to their high viscosity and low ability of the fibers to become wet.

Using LFRTP fibers in manufacturing a rigid body made of composite material that has at least one continuous surface that is smooth, such as a shell, is known through document US2010/0209683-A1. The process involves applying a series of fabrics of thermoplastic fibers forming a mat to a substrate made of a mixture of thermo-fusible fibers and other fibers that do not react at the same melting temperature as the thermo-fusible fibers of the mixture for the purpose of forming a multilayer structure, and subjecting the multilayer structure that is so formed to a cycle of heating and compression while at the same time bringing the set of fabrics of thermoplastic fibers of the structure in contact with a continuous and smooth heating surface that is part of a heating system in order to form the rigid portion of composite material. The proposed substrate comprises thermosetting components selected from the group consisting of polyvinyl esters, phenolic resins, unsaturated polyesters and epoxy. The thermoplastic fibers of the mat are selected from the group of thermoplastic fibers consisting of polypropylenes, polyesters and co-polyesters, polyamides, polyethylene, polyvinyl chloride and polyphenylene sulfide. The other fibers of the substrate comprise thermoplastic fiber.

According to the examples described in said document, the process basically consists of thermoforming, consisting of arranging portions of fiber reinforced LFRTP fabrics on a mold reproducing the geometry of the shell of a helmet forming several layers, one on top of the other, heating the multilayer structure and applying pressure under vacuum for a certain time. Cooling to a temperature which allows demolding is then performed. The thermoforming process used in this document does not allow manufacturing shells having an almost closed geometry, so applying said process is ineffective in helmet typology the shells of which must comply with the main functions described above.

It would therefore be desirable to have a method of manufacture that allows effectively, rapidly and economically producing bodies having an almost closed geometry such as the shells described above.

DISCLOSURE OF THE INVENTION

For the purpose of providing a solution to the problems considered, a method of manufacturing a body made of composite material in thermoplastic matrix provided with an inner cavity with an outward opening, said cavity comprising at least one concave curved wall and the outward opening having a smaller dimension than the maximum dimension of the inner cavity between two opposite walls is disclosed.

Essentially, the method is characterized in that it comprises:
  a first step of cutting fabrics preimpregnated with thermoplastic resin into portions according to a pattern of the body to be manufactured, wherein at least some of said preimpregnated fabrics are LFRTP-type fabrics, reinforced with long woven or non-woven fibers;
  a second step of placing the portions of preimpregnated fabrics in a mold provided with an inlet in the closed position, divided into at least two facing half-molds the closure of which configures a female type cavity reproducing the negative geometry of the body, arranging the portions of preimpregnated fabrics superposed in multiple layers forming a multilayer structure, firstly positioning the portions that will constitute the outer layer of the body to be manufactured on the walls of the cavity of the mold and lastly the portions that will constitute the inner layer, the outer layer being formed by at least one stratum of portions of "veil" type or "felt" type fabrics, containing non-woven and non-oriented fibers of lengths comprised between 5 and 20 mm;
  a third step of placing a head provided with a bag configured as a male component with respect to the mold, closing the inlet of the mold, the bag being located inside the cavity of the mold;

a fourth step of applying pressure inside the bag causing the bag to inflate and expand to such a volume causing the contact and pressure of the surface of the bag against the portions of fabrics arranged on the walls of the cavity of the mold and the thrust thereof against the walls of the mold;

a fifth step, simultaneous to the fourth step, of applying heat on the half-molds starting from room temperature up to an operating temperature value such that it causes the melting of the thermoplastic resin present in the fabrics and its flow to reproduce the geometry of the mold;

a sixth step of cooling the half-molds to a temperature such that it allows extracting the solidified molded body from the mold without becoming deformed;

a seventh step of depressurizing the bag until at least achieving that such bag no longer contacts the walls of the cavity of the mold;

an eighth step of withdrawing the head from the inlet of the mold whereby the bag is extracted from inside the cavity of the mold;

a ninth step of opening the mold by separating the at least two half-molds from one another; and a tenth step of extracting the molded body.

Using the LFRTP-type preimpregnated fabrics allows incorporating the advantages of thermoplastic matrices, such as: high impact resistance, good compression and particularly flexural strength, good chemical resistance and low moisture absorption, very short molding cycles because there is no hardening reaction during elaboration, good weldability, possibility of recovering trimmings and waste materials, unlimited storage at room temperature, which allows optimal in process management of stocks of the materials and the good ability to be recycled at the end of the service life of the shell.

The drawbacks associated with thermoplastic matrices, such as difficulty in impregnating the fibers and in molding parts that have a high curvature and are tightly closed, have all been overcome at the same time with the described process.

According to a feature of the invention, prior to placing the portions of fabrics of the second step, a gel coat is applied on the walls of the cavity of the mold, the type of gel coat applied being compatible with the thermoplastic resin of the preimpregnated fabrics.

According to another feature of the invention, prior to or as the placement of the portions of fabrics of the second step takes place, a tack enhancing product, compatible with the thermoplastic resin of the preimpregnated fabrics, is applied on the walls of the cavity of the mold and on the portions of fabrics placed to improve the support of the portions of fabrics on the mold and of some portions on others.

According to another feature of the invention, in the third step, the bag is subjected to a negative pressure and the bag internally comprises a cage-like part to which the bag is adhered due to the negative pressure to which it is subjected in said step.

According to another feature of the invention, the value of the pressure that is applied inside the bag in the fourth step is comprised between 5 and 10 bar.

According to another feature of the invention, simultaneously to applying pressure in the fourth step, heating means provided in the mold are activated for applying the heat of the fifth step.

According to another feature of the invention, the operating temperature of the fifth step is comprised between 100° C. and 280° C., depending on the melting temperature of the thermoplastic used.

According to another feature of the invention, the time during which the heat of the fifth step is applied is the time necessary for causing said melting of the thermoplastic material of the thermoplastic resin present in the fabrics and its flow to reproduce the geometry of the mold. According to another feature of the invention, the cooling of the sixth step is performed by forced convection by means of a cooling circuit for cooling the at least two female half-molds configuring the mold.

According to another feature of the invention, the method comprises an eleventh step of finish operations for finishing the body, such as cutting, drilling and surface finish operations.

The body made of composite material object of manufacture according to the described method can be a shell of a helmet for use in vehicles, essentially formed by a hollow body, forming the resistant part of the helmet in the event of a collision in accidents. In the same manner, the mentioned body can be the resistant component of sports footwear, such as a ski boot.

According to another feature of the invention, the length of the fibers in the LFRTP-type preimpregnated fabrics is at least 50 mm.

According to another feature of the invention, the LFRTP-type preimpregnated fabrics are hybrid fabrics of synthetic or inorganic fiber combined with thermoplastic fiber, or synthetic or inorganic fabrics incorporating the thermoplastic resin in suspension or diluted.

In the method object of the invention particularly indicated for manufacturing a shell, the thermoplastic resin of the preimpregnated fabrics is preferably polypropylene resin and the long fibers of the LFRTP-type fabrics are E-type glass fibers.

The fibers of the preimpregnated fabrics of the outer layer are preferably hybrid fibers resulting from the combination of polypropylene yarns with glass yarns, typically by commingling. According to another feature, the outer layer has a surface density comprised between 20 and 100 $g/m^2$ and a fiber weight fraction comprised between 20% and 40%.

Continuing with the method object of the invention for manufacturing a shell of a helmet, the LFRTP-type preimpregnated fabrics are preferably "twill" type woven fabrics in which the fibers constituting the weft and the fibers constituting the warp of the fabric have the same number of fibers per unit area of fabric. The stratum or strata constituting the inner layer each have a surface density comprised between 300 and 2000 $g/m^2$ and a fiber weight fraction comprised between 50 and 70%. Furthermore, the inner layer can comprise sections with a different number of strata.

According to another feature, in the second step of the method of manufacturing the shell, superposed portions of fabrics preimpregnated with thermoplastic resin constituting a reinforcement layer are placed in specific areas and located between the outer layer and the inner layer, or between the strata of the inner layer. The portions of fabrics of the reinforcement layer are preferably unidirectional or plain-woven portions of fabrics, where each of the strata of the reinforcement layer has a surface density comprised between 300 and 2000 $g/m^2$ and a fiber weight fraction comprised between 50 and 70%.

According to another feature, the multilayer structure comprises sections with different surface density, with a minimum value of 1000 g/m$^2$ and a maximum value of 3500 g/m$^2$, and an average value comprised between 1800 and 2400 g/m$^2$.

According to a second aspect, an apparatus for carrying out the method described above is disclosed.

The apparatus is characterized in that it comprises:
- a mold provided with an inlet in the closed position, divided into at least two facing half-molds the closure of which configures a female type cavity reproducing the negative geometry of the body;
- a head provided with a bag configured as a male component with respect to the mold, the bag being located inside the cavity of the mold when the head is positioned closing the inlet of the mold;
- heating means for heating the mold;
- cooling means for cooling the mold; and
- means for applying pressure inside the bag.

According to another feature of the invention, the at least two half-molds are movable with respect to one another. The half-molds can be made of an aluminum or steel alloy.

According to another feature of the invention, the material from which the bag provided in the head is formed is silicone.

According to another feature of the invention, the head is attached in an articulated manner to the mold in the upper part on the side provided with the inlet.

According to a third aspect of the invention, a shell of a helmet for use in vehicles, essentially formed by a hollow body, forming the resistant part of the helmet in the event of a collision in accidents, is disclosed.

Essentially, the shell object of the invention is characterized in that the hollow body has a multilayer structure comprising an outer layer and an inner layer, in which the outer layer is formed by at least one stratum of portions of "veil" type or "felt" type fabrics preimpregnated with thermoplastic resin, containing non-woven and non-oriented fibers of lengths comprised between 5 and 20 mm, and in which the inner layer is formed by at least one stratum of portions of LFRTP-type fabrics preimpregnated with thermoplastic resin, reinforced with long woven or non-woven fibers.

According to another feature of the shell object of the invention, the length of the fibers in the LFRTP-type preimpregnated fabrics is at least 50 mm.

According to another feature of the invention, the LFRTP preimpregnated fabrics are hybrid fabrics of synthetic or inorganic fiber combined with thermoplastic fiber or synthetic or inorganic fabrics incorporating the thermoplastic resin in suspension or diluted.

According to another feature of the invention, the thermoplastic resin of the preimpregnated fabrics is polypropylene resin and the fibers of the LFRTP-type fabrics are E-type glass fibers.

According to another feature of the invention, the fibers of the preimpregnated fabrics of the outer layer are commingled fibers resulting from the combination of polypropylene fibers with glass fibers or they are polypropylene fibers mixed with glass fibers.

According to another feature of the invention, the outer layer has a surface density comprised between 20 and 100 g/m$^2$.

According to another feature of the invention, the outer layer has a fiber weight fraction comprised between 20% and 40%.

According to another feature of the invention, the LFRTP-type preimpregnated fabrics of the inner layer are twill type woven fabrics in which the fibers constituting the weft and the fibers constituting the warp of the fabric have the same number of fibers per unit area of fabric.

According to another feature of the invention, the stratum or strata constituting the inner layer each have a surface density comprised between 300 and 2000 g/m$^2$.

According to another feature of the invention, the stratum or strata constituting the inner layer each have a fiber weight fraction comprised between 50 and 70%.

According to another feature of the invention, the inner layer comprises sections with a different number of strata.

According to another feature of the invention, the multilayer structure of the hollow body comprises superposed portions of fabric preimpregnated with thermoplastic resin constituting a reinforcement layer in specific areas and located between the outer layer and the inner layer, or between the strata of the inner layer.

According to another feature of the invention, the portions of fabrics of the reinforcement layer are unidirectional or plain-woven portions of fabrics, where each of the strata of the reinforcement layer has a surface density comprised between 300 and 2000 g/m$^2$ and a fiber weight fraction comprised between 50 and 70%.

According to another feature of the invention, the multilayer structure of the hollow body comprises sections with different surface densities, with a minimum value of 1000 g/m$^2$ and a maximum value of 3500 g/m$^2$, and an average value comprised between 1800 and 2400 g/m$^2$.

BRIEF DESCRIPTION OF THE DRAWINGS

The attached drawings illustrate two embodiments of the apparatus for carrying out the method object of the invention by way of a non-limiting example. In said drawings.

DETAILED DESCRIPTION OF THE INVENTION

Figure 1:
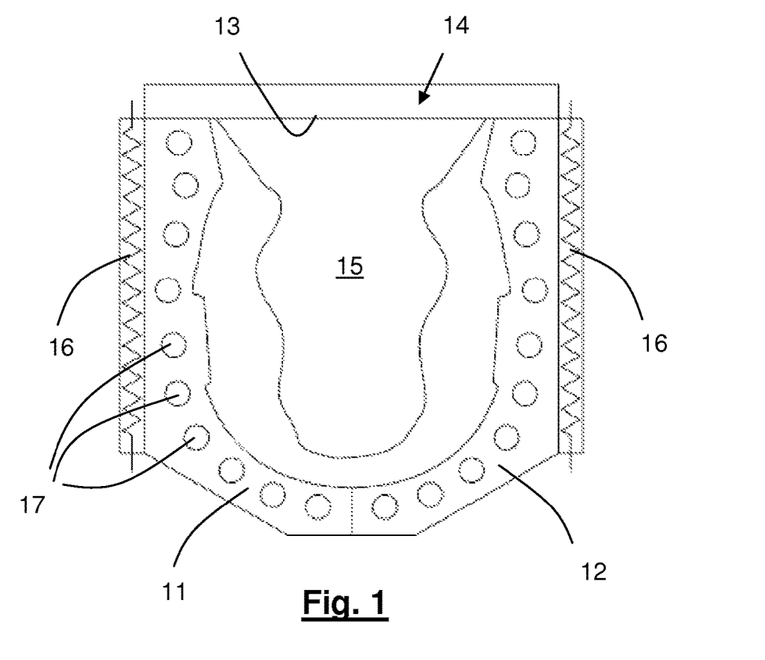
FIG. 1 shows a schematic section view according to a vertical section of a first embodiment of the apparatus object of the invention.

FIG. 1 schematically shows an apparatus for manufacturing a body 1 made of composite material in thermoplastic matrix provided with an inner cavity with an outward opening, said cavity comprising at least one concave curved wall and the outward opening having a smaller dimension or width than the maximum dimension of the inner cavity between two opposite walls, such as a shell of a helmet for use in vehicles, essentially formed by a hollow body 1 and forming the resistant part of the helmet in the event of a collision in accidents. The opening of the shell is where the user of the helmet introduces his/her head.

Figure 3:
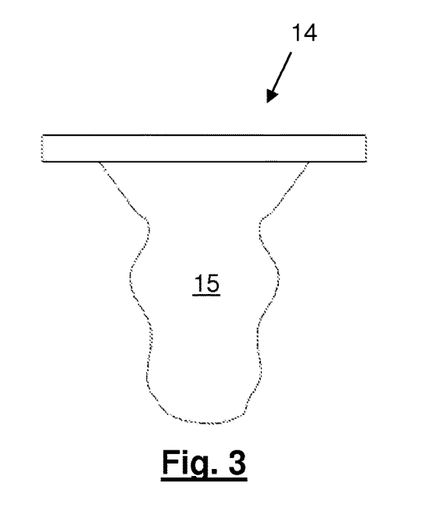
Figure 5:
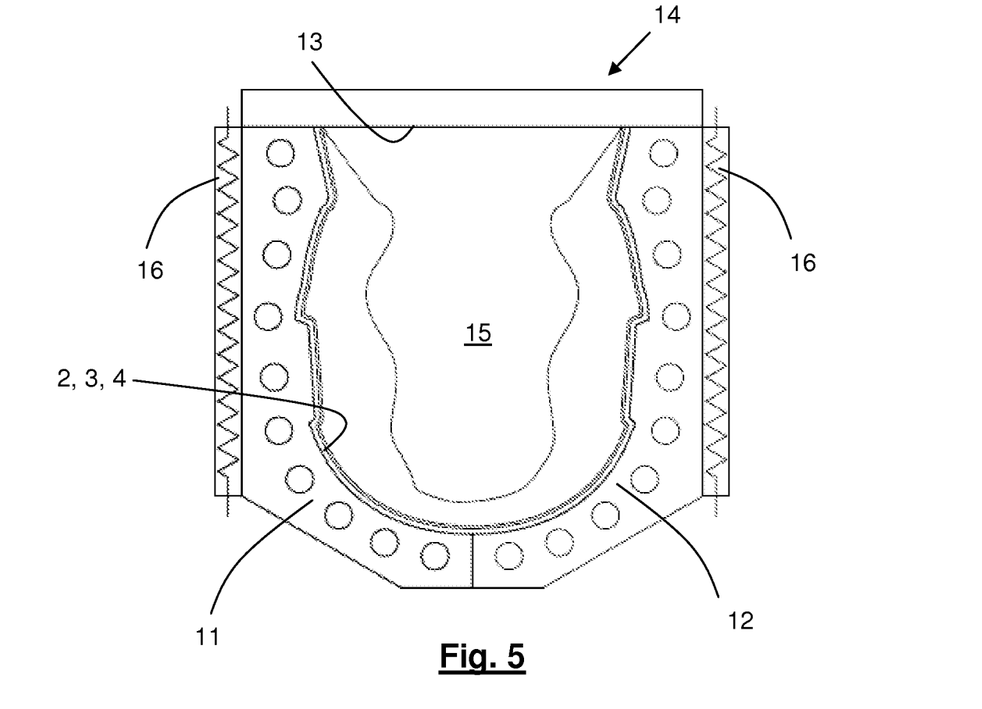
Figure 6:
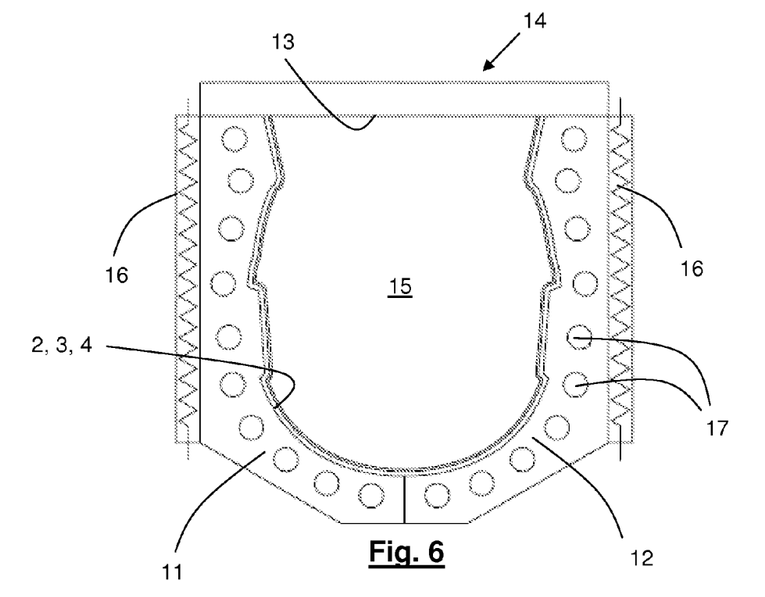

The apparatus basically comprises the following elements:
- a mold provided with an inlet 13 in a closed position (see FIGS. 1, 5 and 6), divided into at least two facing half-molds 11 and 12 and the closure of which configures a female type cavity reproducing the negative geometry of the body 1 to be manufactured;

a head 14 provided with a bag 15 (see FIG. 3) made of silicone, configured as a male component with respect to the mold, the bag 15 being located inside the cavity of the mold when the head 14 is positioned closing the inlet 13 of the mold (see FIGS. 1, 5 and 6). To facilitate closing the mold, the head 14 is attached in an articulated manner to the mold in the upper part on the side provided with the inlet 13;

heating means 16 for heating the mold;

cooling means 17 for cooling the mold; and means for applying pressure inside the bag 15.

Figure 7:
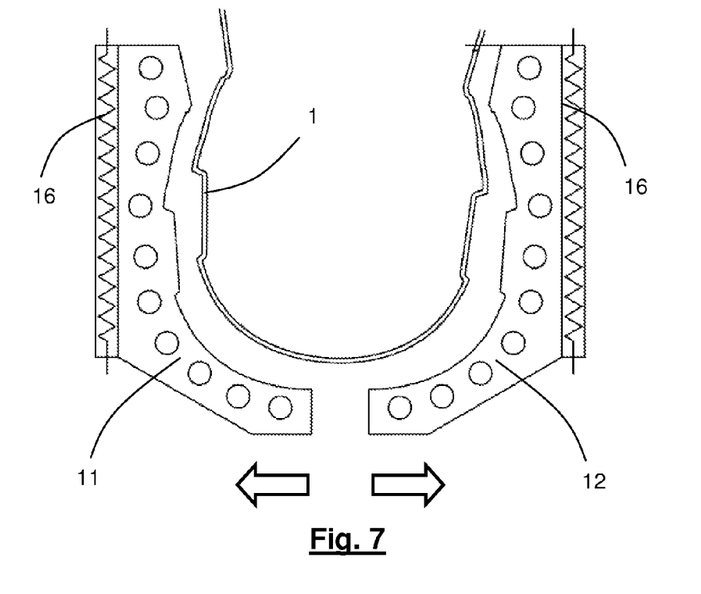

As can be seen in FIG. 7, the two half-molds 11 and 12 are movable with respect to one another to enable extracting the manufactured body 1 from the mold because the closed geometry of the body 1 makes a direct extraction impossible, as occurs in other methods such as the thermoforming method. In fact, one the two half-molds 11 or 12 is separated from the other by pneumatic actuation, and sometimes a gap comprised between 10 and 100 mm is sufficient.

Figure 2:
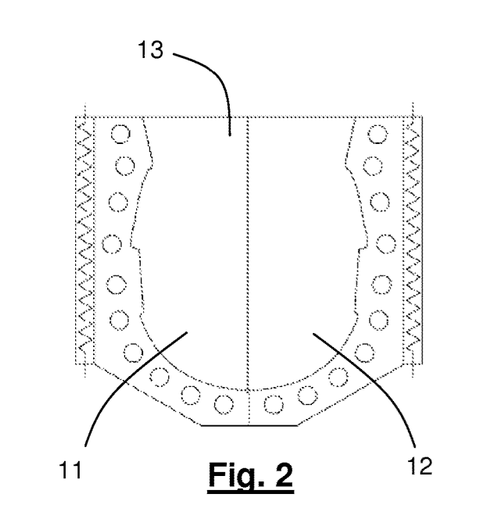
FIGS. 2 and 3 are respective views of the mold and the head of the apparatus of FIG. 1.

The two or more half-molds 11 and 12, shown separately in FIG. 2 (the articulated head 14 has been omitted), are made from hokotol aluminum or steel, and are provided with heating means 16 responsible for providing heat to the part to be molded. In the mold reproduced in FIGS. 1 to 7, the heating means 16 comprise electric heating wires coupled to their outer faces, although according to other typologies, the heating means 16 can adopt a spark plug type system for new molds or be formed by an already existing flat resistance box for molds that are to be adapted to the process of manufacture that will be described in this section. The power and typology of the resistance system depends on the width and material of the mold and on the application itself, which for the case of shells for helmets, has a power value that can vary approximately from as low as 10 kW to up to 200 kW.

Figure 8:
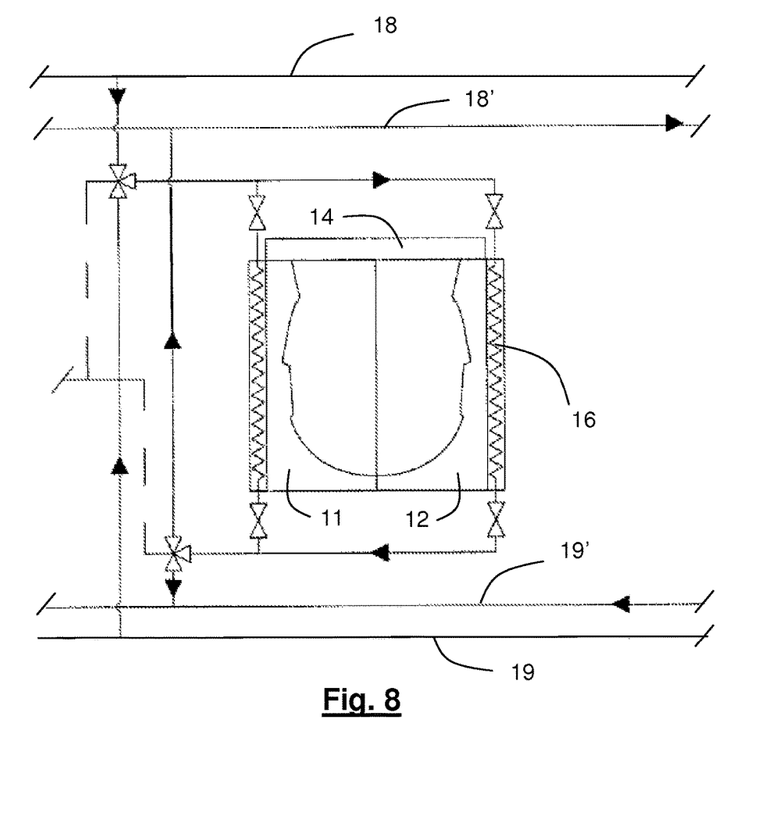
FIG. 8 is a schematic section view according to a vertical section of a second embodiment of the apparatus object of the invention.

Another typology of heating means 16 is the one schematically shown in FIG. 8, wherein the mold is heated by a system based on oil pipes in contact with the mold, as for instance a oil/air exchanger. Indeed, in FIG. 8 the oil heater and the oil/air exchanger are not depicted but it can be seen the connections of the input line 18 coming from an oil heater, the output line 18' going to the oil heater, the input line 19 coming from the oil/air exchanger and the output line 19' going to the oil/air exchanger. In order to manufacture a shell for a helmet, the power of the oil heater may be within the range of 10 to 200 kW, and the same range is valid for the power of the oil/air exchanger.

To extract heat from the molded part, the extraction is performed by forced convection by means of the cooling means 17, consisting of an oil or water based cooling circuit for cooling the half-molds 11 and 12 constituting the female mold. In newly built molds, the circulation ducts are incorporated in the mold itself, whereas in compatibilized molds, which are those molds originally built for a process for molding thermosetting composite materials using a bag but modified to be adapted to the process of manufacture, that will be explained below, in which LFRTP-type composite materials having a thermoplastic matrix and long fibers are involved, exchange plates in contact with the mold are used. The exchange fluid is conveyed by means of a closed circuit hydraulic cooling unit.

The method of manufacturing a body 1 made of thermoplastic matrix composite material provided with an inner cavity with an outward opening 2 is described in detail below with the aid of the drawings, said cavity comprising at least one concave curved wall and the outward opening having a smaller dimension than the maximum dimension of the inner cavity between two opposite walls. For practical purposes, the body 1 depicted consists of a shell of a helmet for use in vehicles, which body forms the resistant part of the helmet in the event of a collision in accidents.

The first step consists of cutting fabrics preimpregnated with thermoplastic resin into portions according to a pattern of the body 1 to be manufactured, wherein at least some of said preimpregnated fabrics are woven or non-woven LFRTP-type preimpregnated fabrics, i.e., Long Fiber Reinforced Thermoplastic, in which the length of the fibers is at least 50 mm. The mentioned fabrics can be cut by means of a die cutter and allows performing the operation in high production volumes.

Figure 4:
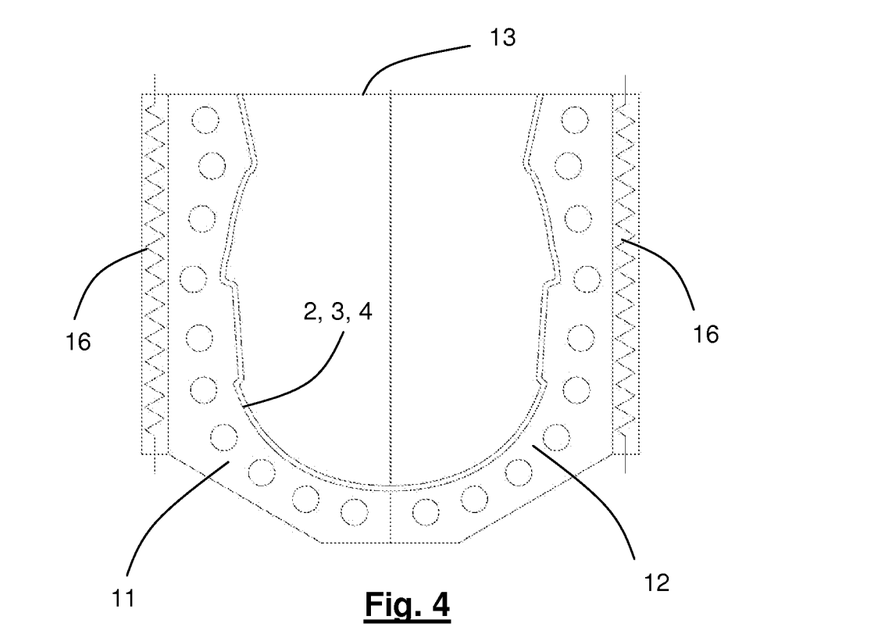
FIGS. 4 to 7 are views of the apparatus of FIG. 1 in different steps of the method of manufacturing a shell according to the invention.

Then in a second step, depicted in FIG. 4, the portions of preimpregnated fabrics (some of which are LFRTP-type) are placed in the mold provided with an inlet 13, the mold being in the closed position. As described above, the mold is divided into at least two facing half-molds 11 and 12 the closure of which configures a female type cavity reproducing the negative geometry of the body 1. The portions of preimpregnated fabrics are arranged superposed on one another in multiple layers forming a multilayer structure, firstly positioning the portions that will constitute the outer layer 2 of the body 1 to be manufactured on the walls of the cavity of the mold and lastly the portions that will constitute the inner layer 4, being able to intercalate a reinforcement layer 3 between the outer layer 2 and the inner layer 4 in specific areas. Of the multiple layers, at least the inner layer 4 is formed by at least one stratum of portions of long fiber reinforced, LFRTP-type preimpregnated fabrics.

In this operation, the head 14 is not closed on the inlet 13 of the mold precisely to allow placing the portions of preimpregnated fabrics, and the temperature and pressure have a room value.

Optionally and depending on need of the product or the materials used, the operation of placing the portions on the cavity of the mold can be complemented by means of application of a gel coat on the mold prior to the fabrics application, when it is more effective than the equivalent post-molding operations of polishing, applying putty and preparing for painting. The type of gel coat will be selected such that it is compatible with the matrix or thermoplastic resin typology used in the composite material. A proven option with polyolefin matrices are acrylic gel coats with which optimal adhesion has been obtained.

Given that the walls of the mold are mostly vertical in some areas, it is possible that help will be needed to achieve minimum support of the stacking or superposition of the portions of fabrics prior to introducing the male bag 15. For that purpose and to achieve minimum tackiness, a type of light glue applied by spraying in the mold and on the fabrics themselves can be used. Said glue must be compatible with the type of thermoplastic used as the matrix in the preimpregnated fabrics. For example, with a LFRTP fabric with polypropylene matrix a short-chain polyolefin glue could be used.

In the third step of the method, depicted in FIG. 5, the head 14 provided with the male bag 15 is placed, closing the inlet 13 of the mold, the bag 15 being located inside the cavity of the mold covered with the portions of fabric in the preceding step. The temperature and pressure applied in the part, i.e., on the multilayer structure, is still room temperature. In automated systems such as the one described, the bag 15 is held against a small structure inside the bag 15 configured as a cage, by means of applying slight negative pressure (generated by means of a Venturi effect suction, common for generating slight pressure drops in equipment with a pneumatic compressor by without a specific vacuum line). The bag 15 is introduced automatically by the pneumatic actuation on the articulated head 14 incorporating the upper mold closure, the bag 15, a vacuum valve and all the pneumatic wiring.

In the fourth step, pressure is applied inside the bag 15, causing the bag to inflate and expand to such a volume causing the contact and pressure of the surface of the bag 15 against the portions of fabrics arranged on the walls of the cavity of the mold and the thrust thereof against the walls of the mold, as shown in FIG. 6. In this step, the temperature value continues to be room temperature. The applied pressure is comprised between 5 and 10 bar, according to the application. For applications intended for a shell of a helmet, the pressure value is approximately of 7 bar. The heating means 16 for heating the mold are simultaneously activated.

Thus in the fifth step, simultaneous to the fourth step, heat is applied on the half-molds 11 and 12 starting from room temperature up to an operating temperature value such that it causes the melting of the thermoplastic resin present in the preimpregnated fabrics of the multilayer structure and its flow to reproduce the geometry of the mold.

The time the heating lasts is the minimum time possible for achieving said melting. Given that there is no slow-kinetics curing reaction, as would be the case with traditional thermosetting matrices, the heating ramp could be as fast as allowed by the deliverable power and thermal inertia of the part-mold system.

The necessary maximum temperatures will depend on the thermoplastic material used as the matrix. It should be stated that said maximum temperatures are somewhat lower than the typical necessary maximum temperatures for processing thermoplastics by means of injection. This is so because a low enough viscosity is necessary in an injection process so that the thermoplastic in liquid state travels through the extruder screw, injection nozzle, the inside of the mold, etc., whereas in the present application where LFRTP-type prepreg fabrics (preimpregnated with the matrix or incorporating it as thread or yarn), the distance between the initial position of the thermoplastic in the fiber and its position once said fiber has been formed is greatly reduced. To do so, it is sufficient to reach the melting temperature of said thermoplastic.

As temperature reference, satisfactory results have been obtained with maximum temperatures between 160° C. and 170° C. using polypropylene, for polyamides in general, the values are around 220° C., for polybutylene terephthalate about 225° C. and for polycarbonate 220° C.

The heating ramp or time necessary for heating the part or multilayer structure up to the melting temperature will depend on the total thermal inertias of the system. As a reference, for a metal mold for a motorcycle helmet such as the one that has been described, using a power input within the range from 50 to 150 kW and with a stratified LFRTP with a PP matrix and thickness of approximately 2 mm, the heating time is of the order of 3 to 5 minutes.

The time during which said temperature must be maintained is virtually non-existent because when the part, for example with polypropylene matrix, reaches 165° C. (or the melting temperature of the thermoplastic used), it is possible to start extracting heat to reduce the temperature. On the other hand, given that it is complicated to measure the temperature in the molded part, the mold temperature is usually referred to. Considerable time elapses between the time the mold reaches those 165° C. and the time that the material of the part reaches this temperature, in addition to there being a minimum thermal gradient necessary (because the mold is somewhat hotter) for the heat to flow. Therefore, in relation to the temperature of the part, there is not an actual maintenance step but in relation to the temperature of the mold the temperature has to be maintained for a certain time to assure that the part has reached said melting temperature.

Thus, the sixth step consists of cooling the half-molds 11 and 12 to a temperature such that it allows extracting the solidified molded body 1 from the mold without becoming deformed and with safety for the operator who is going to extract the body 1 from the mold. In this step, the mold continues in the closed position. As an example, for structures in which the matrix of the LFRTP-type preimpregnated fabrics involved is polypropylene, the temperature at which it will be cooled will be approximately 50° C. due to the structural strength of the part during the extraction. In other thermoplastics, such as polyamide, it will be 70° C. (in this case, the limiting factor is the thermal insulation of the operator's gloves when extracting the part or body 1).

The pressure continues to the same as it was during the heating, between 5 and 10 bar, particularly 7 bar.

The time used will be the minimum time possible for reaching the extraction temperature. Given that there is no slow-kinetics curing reaction, as would be the case with traditional thermosetting matrices, the cooling ramp could be as fast as that allowed by the inertia and the thermal insulation of the body 1 and the mold, and the power of the system that is applied for extraction. As a reference, for a metal mold for an aluminum or steel motorcycle helmet, and with a stratified LFRTP with a PP matrix and thickness of approximately 2 mm, the cooling time is from 1 to 3 minutes.

The seventh step is depressurizing the bag 15 until at least achieving that such bag no longer contacts the walls of the cavity of the mold. The mold continues to be closed and pressure is removed from inside the bag 15, applying a slight pressure drop (less than atmospheric pressure) to detach the bag 15 from the walls of the mold.

Then in the eighth step, the head 14 is raised and the bag 15 is extracted from of the mold. The temperature continues to drop.

In the ninth step, the mold is opened by separating the at least two half-molds 11 and 12, as indicated in FIG. 7.

In the tenth step, the molded body 1 is extracted without the help of extractors integrated in the mold being necessary. When the body 1 is a shell or the resistant body of a ski boot, the molded body 1 can easily be extracted by hand.

In an eleventh step, post-molding operations consisting of finish operations for finishing the body 1, such as cutting, drilling and surface finish operations, are carried out.

Given that the molding is not performed in a rigid closed mold, the edges, outlines or ends of the molded part will not have a well-resolved finish like they would in an injection process, and for this reason it is necessary to cut the excess material. The same occurs when making possible boreholes in the shell for fixing other elements, ventilation openings, etc. All these drilling and trimming operations can be done in a semi-manual manner with cutting templates or in an automated manner in conventional CNC cutting stations or CNC cutting by means of high pressure water.

With respect to the surface finish, as also occurs in shells manufactured by thermoplastic injection, a series of surface preparation operations must be performed before painting for the purpose of improving the superficial and aesthetic quality. Said operations could include: cleaning, applying putty on surface flaws, polishing, preparing for painting, etc. The amount of operations and materials will depend on the matrix used and the desired type of finish.

It can generally be indicated that the surface finish of bodies 1 with LFRTP-type preimpregnated fabrics usually has an intermediate post-molding quality between the parts produced by thermoplastic injection and by composite thermosetting: slightly lower quality than the former but definitely better than the latter. This will entail an inversely proportional amount and intensity of finish operations, always assuming an equivalent finish level.

When comparing a part with LFRTP-type fabrics produced according to this method with its homologous part produced according to composite thermosetting (with equal stratification), the body 1 comprising composite material based on preimpregnated LFRTP fabrics has a better surface finish since the imprinting or marking phenomena in LFRTP-type woven fabrics in the mold is less significant, since the matrix has a higher viscosity and is closely linked to the reinforcement fiber.

The difficulty in applying painting operations in the body 1 produced according to the method described above is equivalent to that of a part manufactured by plastic injection with the same matrix, essentially depending on the surface energy of said material and, therefore, on its ability for the adhesion of other materials. Thus, for example, a part with LFRTP with an ABS matrix will be very easy to paint, whereas an LFRTP part with a polypropylene matrix will present more difficulties, making necessary an operation prior to painting, such as priming for example, or even in some cases surface activation by methods such as flaming or plasma treatment.

The multilayer structure preferred for manufacturing a body 1 consisting of a shell of a motorcycle helmet forming the resistant part in case of impact is described below as an example. This multilayer structure is what is formed in the second step of the method described above by means of placing the portions of fabrics preimpregnated with thermoplastic resin on the walls constituting the cavity of the mold and reproducing the negative geometry of the shell.

As the common element, all the fabrics preimpregnated with thermoplastic resin are cited below as they are involved in this multilayer structure particularly indicated for a shell have a polypropylene (PP) matrix and the fibers are glass fibers, particularly E-type glass fibers. The woven or non-woven preimpregnated fabrics reinforced with fiber involved may have been produced by means of any of the following technologies: mixed or hybrid yarns or threads (known as commingled yarn), hybrid fabrics, milling and melting a thermoplastic on the fabric (known as fabric powdering), etc.

The body 1, the shell in this example, has a multilayer structure comprising an outer layer 2, the strata of which formed by the superposition of portions of preimpregnated fabrics are the first ones that are placed on the cavity of the mold, and an inner layer 4, the strata of which are the last ones that are placed in the mold.

The outer layer 2 is formed by at least one stratum of portions of veil type or felt type fabrics, containing short non-woven textile fibers of lengths comprised between 5 and 20 mm, intercalated in a random arrangement and without any predominant direction. Said fibers are hybrid PP/glass type fibers, or fibers made of two types of fiber. The outer layer 2 generally has a surface density comprised between 20 100 g/m$^2$ and a fiber weight fraction (FWF) comprised between 20 and 40%. The function of the outer layer 2 is to improve the surface finish of the shell by means of two ways:

it generates a resin-rich area on the outer surface due to its high PP content;

due to the random nature of the pattern and lower surface roughness, it minimizes the final surface roughness of the shell by the print through phenomenon, according to which the fabric or the drawing conferred by the fabrics is copied on the surface.

With respect to the inner layer 5, it constitutes the structural layer per se and is where the long fiber reinforced LFRTP-type preimpregnated fabrics of lengths equal to or greater than 50 mm (and preferably E-type glass fibers) are located. The long fiber reinforced LFRTP-type preimpregnated fabrics of the inner layer 4 are twill type woven fabrics, type 1/1 or type 2/2, in which the fibers constituting the weft and the fibers constituting the warp of the fabric have the same amount of fibers, i.e., the same number of fibers in either direction per unit area of fabric.

The stratum or strata constituting the inner layer 4 each have a surface density (grammage) comprised between 300 and 2000 g/m$^2$, and for the specific glass/PP fiber combination, they have a fiber weight content of approximately 60%.

The strata of the inner layer 4 can be discontinuous around the body 1, according to specific cutting patterns for the purpose of:

improving the ability to copy or reproduce of the geometry of the part, which in English is known as "drapeability".

adjusting the mechanical properties of the section of the body 1 by varying the number of strata and their grammage to thus adapt it to the different structural features that are a function of the geometry thereof, as well as to the different mechanical performances or needs of each area.

Superposed portions of fabrics preimpregnated with thermoplastic resin constituting a reinforcement layer 3 are placed in specific areas of the body 1, and located between the outer layer 2 and the inner layer 4, or between the strata themselves constituting the inner layer 4. The portions of fabric of the reinforcement layer 3 are unidirectional or plain-woven portions of fabrics, where each of the strata of the reinforcement layer 3 has a surface density comprised between 300 and 2000 g/m$^2$ and a fiber weight fraction comprised between 50 and 70%. The reinforcement layer 3 will virtually never be distributed throughout the entire body 1, but rather its placement is limited to small and specific areas which need extra reinforcement in a particular direction and which, because of their small dimension, allow using a fabric or fabric with a lower ability to be molded to high double curvatures.

Preferably, the number of strata of the inner layer 4 and of the reinforcement layer 3 and the typology thereof will be organized for the purpose of obtaining balanced stratification, i.e., the layers being symmetrical constituents according to the direction perpendicular to the plane of the fabric, and therefore being less sensitive to internal deformation stresses in the molding process. As a general rule, the fabrics constituting the strata of layers 4 and 3 have been designed to have a specific orientation for the purpose of minimizing anisotropy to the greatest extent possible. Thus, for example, is there are two identical strata, they are arranged at 90° with respect to one another, or if there are three strata, one of them belonging to reinforcement layer 3 and therefore arranged between the other two, the fabrics of the two outer strata will be arranged with a 90° orientation with respect to the middle stratum. Nevertheless, the possibility of there being specific areas where this search for isotropy is not followed is envisaged for the purpose of improving properties in specific directions, to compensate for particularities of the geometry of the body 1 or specific circumstances.

The entire stratification formed by layers 2, 3 and 4 described can generally be heterogeneous around the body 1, although for the case of a motorcycle helmet it commonly has a grammage ranging between 1000 and 3500 g/m², depending on the area, and a global average comprised roughly in the range between 1800 and 2400 g/m².

The invention claimed is:

1. A method of manufacturing a body made of composite material with thermoplastic matrix provided with an inner cavity with an outward opening, said cavity comprising at least one concave curved wall and the outward opening having a smaller dimension than a maximum width of the inner cavity between two opposite walls, said method comprising:
   a first step of cutting fabrics preimpregnated with thermoplastic resin into portions according to a pattern of the body to be manufactured, wherein at least some of said preimpregnated fabrics are LFRTP-type fabrics, reinforced with long woven or non-woven fibers;
   a second step of placing the portions of preimpregnated fabrics in a mold provided with an inlet in a closed position, divided into at least two facing half-molds forming a closure of which configures a female type cavity reproducing a negative geometry of the body, arranging the portions of preimpregnated fabrics superposed on one another in multiple layers forming a multilayer structure, firstly positioning the portions that will constitute an outer layer of the body to be manufactured on the walls of the cavity of the mold and lastly the portions that will constitute an inner layer, the outer layer being formed by at least one stratum of portions of veil type or felt type fabrics, containing non-woven and non-oriented fibers of lengths comprised between 5 and 20 mm;
   a third step of placing a head provided with a bag configured as a male component with respect to the mold, closing the inlet of the mold, the bag being located inside the cavity of the mold;
   a fourth step of applying pressure inside the bag causing the bag to inflate and expand to such a volume causing contact and pressure of the surface of the bag against the portions of fabrics arranged on the walls of the cavity of the mold and a thrust thereof against the walls of the mold;
   a fifth step, simultaneous to the fourth step, of applying heat on the half-molds starting from a room temperature to an operating temperature value such the heat causes melting of the thermoplastic resin present in the fabrics and flow of the thermoplastic resin to reproduce a geometry of the mold;
   a sixth step of cooling the half-molds to a temperature to allow extracting the solidified molded body from the mold without becoming deformed;
   a seventh step of depressurizing the bag until the bag no longer contacts the walls of the cavity of the mold;
   an eighth step of withdrawing the head from the inlet of the mold whereby the bag is extracted from inside the cavity of the mold;
   a ninth step of opening the mold by separating the at least two half-molds from one another; and
   a tenth step of extracting the molded body; and
   wherein the fibers of the preimpregnated fabrics of the outer layer are hybrid fibers resulting from the combination of polypropylene fibers with glass fibers; and
   wherein the outer layer has a surface density comprised between 20 and 100 g/m².

2. The method according to claim 1, characterized in that prior to placing the portions of fabrics of the second step a gel coat is applied on the walls of the cavity of the mold, the gel coat applied being compatible with the thermoplastic resin of the preimpregnated fabrics.

3. The method according to claim 1, characterized in that prior to or as the placement of the portions of fabrics of the second step takes place a tack enhancing product, compatible with the thermoplastic resin of the preimpregnated fabrics, is applied on the walls of the cavity of the mold and on the portions of fabrics placed to improve support of the portions of fabrics on the mold and of some portions on others.

4. The method according to claim 1, characterized in that in the third step, the bag is subjected to a negative pressure and in that the bag internally comprises a cage-like part to which the bag is adhered due to the negative pressure to which the bag is subjected in said step.

5. The method according to claim 1, characterized in that the value of the pressure that is applied inside the bag in the fourth step is comprised between 5 and 10 bar.

6. The method according to claim 1, characterized in that simultaneously to applying pressure in the fourth step heating means provided in the mold are activated for applying heat of the fifth step.

7. The method according to claim 1, characterized in that the operating temperature of the fifth step is comprised between 100 and 280° C.

8. The method according to claim 1, characterized in that a time during which the heat of the fifth step is applied is a time necessary for causing the melting of the thermoplastic material of the thermoplastic resin present in the fabrics and the flow of the thermoplastic material to reproduce the geometry of the mold.

9. The method according to claim 1, characterized in that the cooling of the sixth step is performed by forced convection by means of a cooling circuit for cooling the at least two female half-molds configuring the mold.

10. The method according to claim 1, comprising an eleventh step of finish operations for finishing the body.

11. The method according to claim 1, characterized in that the body is a shell of a helmet for use in vehicles, formed by a hollow body, forming the resistant part of the helmet in the event of a collision in accidents.

12. The method according to claim 1, characterized in that the body is a resistant body of sports footwear.

13. The method according to claim 1, characterized in that the length of the fibers in the LFRTP-type preimpregnated fabrics is at least 50 mm.

14. The method according to claim 13, characterized in that LFRTP-type preimpregnated fabrics are hybrid fabrics of synthetic or inorganic fibers combined with thermoplastic fiber or synthetic or inorganic fabrics incorporating the thermoplastic resin in suspension or diluted.

15. The method according to claim 1, characterized in that the thermoplastic resin of the preimpregnated fabrics is polypropylene resin and the fibers of the LFRTP-type fabrics are E-type glass fibers.

16. The method according to claim 1, characterized in that the outer layer has a fiber weight fraction comprised between 20% and 40%.

17. The method according to claim 1, characterized in that the inner layer is formed by at least one stratum of portions of LFRTP-type preimpregnated fabrics.

18. The method according to claim 17, characterized in that the LFRTP-type preimpregnated fabrics of the inner layer are twill type woven fabrics in which the fibers constituting the weft and the fibers constituting the warp of the fabric have the same number of fibers per unit area of fabric.

19. The method according to claim 18, characterized in that the at least one stratum of the inner layer has a surface density comprised between 300 and 2000 g/m².

20. The method according to claim 15, characterized in that the at least one stratum of the inner layer has a fiber weight fraction comprised between 50 and 70%.

21. The method according to claim 17, characterized in that the inner layer comprises sections with a different number of strata.

22. The method according to claim 1, characterized in that in the second step superposed portions of fabrics preimpregnated with thermoplastic resin constituting a reinforcement layer are placed in specific areas and located between the outer layer and the inner layer, or between strata of the inner layer.

23. The method according to claim 22, characterized in that the portions of fabrics of the reinforcement layer are unidirectional or plain-woven portions of fabrics, where each strata of the reinforcement layer has a surface density comprised between 300 and 2000 g/m² and a fiber weight fraction comprised between 50 and 70%.

24. The method according to claim 11, characterized in that the multilayer structure comprises sections with different surface density, with a minimum value of 1000 g/m² and a maximum value of 3500 g/m², and an average value comprised between 1800 and 2400 g/m².

25. An apparatus for carrying out the method defined in claim 1, comprising:
the mold provided with an inlet in the closed position, divided into the at least two facing half-molds the closure of which configures the female type cavity reproducing the negative geometry of the body;
the head provided with the bag configured as the male component with respect to the mold, the bag being located inside the cavity of the mold when the head is positioned closing the inlet of the mold;
the fabrics preimpregnated with thermoplastic resin cut into portions according to the pattern of the body to be manufactured, wherein at least some of said preimpregnated fabrics are LFRTP-type fabrics, reinforced with long woven or non-woven fibers, wherein some of the portions constitute the outer layer of the body to be manufactured on the walls of the cavity of the mold and other of said portions constitute the inner layer, wherein the portions constituting the outer layer include the at least one stratum of portions of veil type or felt type fabrics, containing non-woven and non-oriented fibers of lengths comprised between 5 and 20 mm; and wherein the fibers of the preimpregnated fabrics of the outer layer are hybrid fibers resulting from the combination of polypropylene fibers with glass fibers, such that the outer layer will have the surface density comprised between 20 and 100 g/m2;
heating means for heating the mold;
cooling means for cooling the mold; and
means for applying pressure inside the bag.

26. The apparatus according to claim 25, characterized in that the at least two half-molds are movable with respect to one another.

27. The apparatus according to claim 25, characterized in that the at least two half-molds are made of aluminum or steel.

28. The apparatus according to claim 25, characterized in that the bag is made of silicone.

29. The apparatus according to claim 25, characterized in that the head is attached in an articulated manner to the mold in an upper part on a side provided with the inlet.

30. A shell of a helmet for use in vehicles, formed by a hollow body, forming a resistant part of the helmet in an event of a collision in accidents, wherein the hollow body has a multilayer structure comprising an outer layer and an inner layer, wherein the outer layer is formed by at least one stratum of portions of veil type or felt type fabrics preimpregnated with thermoplastic resin, containing non-woven and non-oriented fibers of lengths comprised between 5 and 20 mm, and wherein the inner layer is formed by at least one stratum of portions of LFRTP-type fabrics preimpregnated with thermoplastic resin, reinforced with long woven or non-woven fibers;
wherein the fibers of the preimpregnated fabrics of the outer layer are hybrid fibers resulting from a combination of polypropylene fibers with glass fibers; and
wherein the outer layer has a surface density comprised between 20 and 100 g/m².

31. The shell according to claim 30, characterized in that a length of the fibers in the LFRTP-type preimpregnated fabrics is at least 50 mm.

32. The shell according to claim 31, characterized in that the LFRTP preimpregnated fabrics are hybrid fabrics of synthetic or inorganic fiber combined with thermoplastic fiber or synthetic or inorganic fabrics incorporating the thermoplastic resin in suspension or diluted.

33. The shell according to claim 31, characterized in that the thermoplastic resin of the preimpregnated fabrics is polypropylene resin and the fibers of the LFRTP-type fabrics are E-type glass fibers.

34. The shell according to claim 30, characterized in that the outer layer has a fiber weight fraction comprised between 20% and 40%.

35. The shell according to claim 30, characterized in that the LFRTP-type preimpregnated fabrics of the inner layer are twill type woven fabrics in which fibers constituting the weft and fibers constituting the warp of the fabric have the same number of fibers per unit area of fabric.

36. The shell according to claim 35, characterized in that a stratum or strata constituting the inner layer each has a surface density comprised between 300 and 2000 g/m².

37. The shell according to claim 30, characterized in that a stratum or strata constituting the inner layer each has a fiber weight fraction comprised between 50 and 70%.

38. The shell according to claim 30, characterized in that the inner layer comprises sections with a different number of strata.

39. The shell according to claim 30, characterized in that the multilayer structure of the hollow body comprises superposed portions of fabric preimpregnated with thermoplastic resin constituting a reinforcement layer in specific areas and located between the outer layer and the inner layer, or between the strata of the inner layer.

40. The shell according to claim 39, characterized in that the portions of fabrics of the reinforcement layer are unidirectional or plain-woven portions of fabrics, where each strata of the reinforcement layer has a surface density comprised between 300 and 2000 g/m² and a fiber weight fraction comprised between 50 and 70%.

41. The shell according to claim 30, characterized in that the multilayer structure of the hollow body comprises sections with different surface densities, with a minimum value of 1000 g/m² and a maximum value of 3500 g/m², and an average value comprised between 1800 and 2400 g/m².

42. The method according to claim 10, wherein the eleventh step of finish operations for finishing the body includes one or more of a cutting, drilling and surface finish operation.

43. The method according to claim 12, wherein the body is the resistant body of a ski boot.

* * * * *